United States Patent [19]

Yamayose

[11] Patent Number: 5,791,832
[45] Date of Patent: Aug. 11, 1998

[54] THROW-AWAY TIP FOR MILLING CUTTERS

[75] Inventor: Tutomu Yamayose, Kyoto, Japan

[73] Assignee: Kyocera Corporation, Kyoto, Japan

[21] Appl. No.: 798,732

[22] Filed: Feb. 13, 1997

Related U.S. Application Data

[63] Continuation of Ser. No. 430,062, Apr. 27, 1995, abandoned.

[30] Foreign Application Priority Data

Apr. 28, 1994 [JP] Japan .................. 6-092393

[51] Int. Cl.$^6$ .................................................. B23P 15/28
[52] U.S. Cl. ...................... 407/113; 407/42; 407/61
[58] Field of Search ...................... 407/42, 61, 113

[56] References Cited

U.S. PATENT DOCUMENTS

| | | | |
|---|---|---|---|
| 4,572,713 | 2/1986 | Schmidt | 407/113 |
| 4,913,604 | 4/1990 | Zaengerle | 407/113 |
| 5,059,069 | 10/1991 | Lagerberg | 407/113 |
| 5,059,070 | 10/1991 | Baker | 407/42 |
| 5,325,748 | 7/1994 | Ehrenberg | 407/42 |

*Primary Examiner*—A. L. Pitts
*Assistant Examiner*—Christopher Kirkman
*Attorney, Agent, or Firm*—Loeb & Loeb LLP

[57] ABSTRACT

A disposable tip for a milling cutter. The disposable tip has a top surface, a side surface and a cutting surface. The cutting surface has a cutting edge formed at the intersection of the cutting surface and the side surface. The cutting edge is oriented substantially parallel to the longitudinal direction defined by the top surface. A plurality of flutes are formed on the cutting edge. The cutting surface and the top surface define a rake angle between 2° and 30°.

1 Claim, 3 Drawing Sheets

When the rake angle is large, continuous type chips are formed.

THROW-AWAY TIP FOR MILLING CUTTERS

This is a continuation of application Ser. No. 08/430,062 filed on Apr. 27, 1995, now abandoned.

BACKGROUND OF THE INVENTION

This invention relates to a throw-away tip used for milling cutters.

Of the milling cutters with a long cutting edge to which a plurality of tips are mounted for cutting metallic materials, there are those which use a throw-away tip for milling cutters with non-cutting flutes (hereinafter called the "tip").

FIG. 3 shows such a milling cutter 4, and this milling cutter 4 is equipped with tip seats 6 faces toward the side face of the tool proper and is designed to mount the tips to these tip seats 6, and to each of the tip seats 6, tips in which non-cutting flutes are formed are mounted.

Such a milling cutter 4 with a long cutting edge produces large resistance as well as large noise during cutting and results in the degraded work efficiency and deteriorated environment, but the said milling cutter 4 can exhibit effects of reducing tip resistance and suppressing noise.

Conventionally, for the tips with non-cutting flutes used in these milling cutters 4, the tip 10 with no rake angle provided at the cutting edge to secure cutting edge strength is used.

However, the said conventional tip has the following defects.

That is, the tip with no rake angle provided at the cutting edge portion has a large cutting-edge angle a of the cutting edge 2 as shown in FIG. 6, and contacts the work at a large angle. This increases cutting resistance and generates chattering during cutting or as shown in the same figure, increases thickness of chips, and because of heavy chips, the chip flow becomes poor and segmented chips are likely to be caught between the cutting edge 2 and the work, and as a result, the cutting edge 2 is apt to break due to chips welded to both the work and the cutting edge 2 by the heat generated at the cutting edge 2.

In order to solve the said problem of the conventional technique, the present invention reduces the cutting strength of the cutting edge by forming a positive rake angle of the cutting edge of the tip for milling cutters with non-cutting flutes, and sets the said rake angle to 2° to 30°.

EMBODIMENTS

This invention will be described in further detail with reference to the accompanying drawings.

Figure 1:
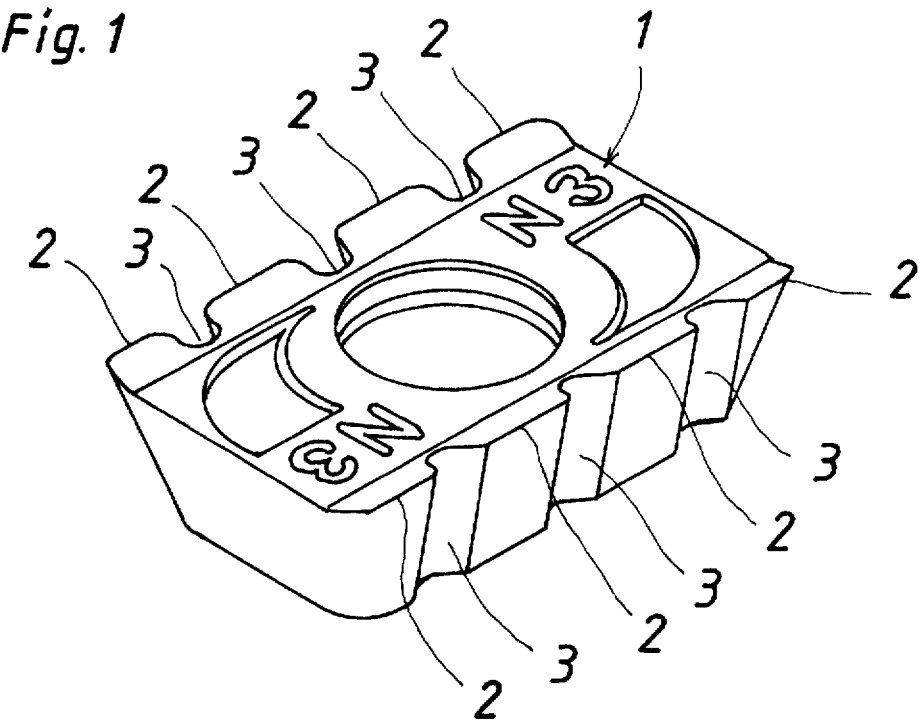
FIG. 1 is a perspective view of a throw-away tip for milling cutters of the embodiment of the present invention.
Figure 2:
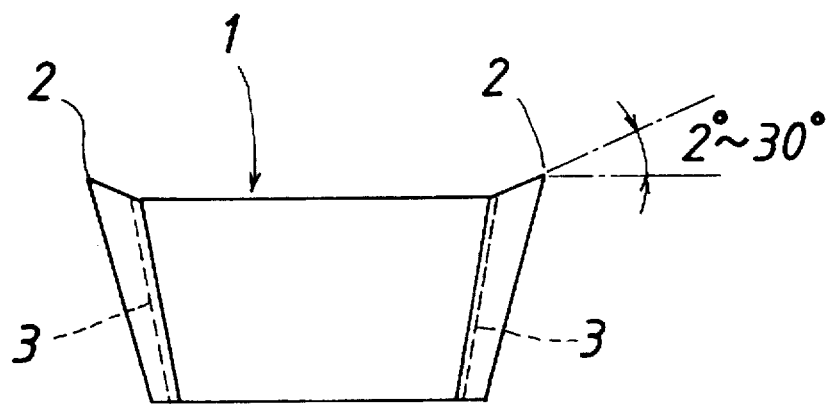
FIG. 2 is a front view of a throw-away tip for milling cutters of the embodiment of the present invention.

FIG. 1 and FIG. 2 show the tip 1 of this embodiment, and as shown in FIG. 1, this tip 1 is in the form of plate with a nearly rhombic plane profile, and cutting edges 2, 2 are formed at intersections between the top-surface long piece and the side face, and to the said cutting edges 2, 2, one to four noncutting flutes 3 are formed.

The said tip 1 forms a 2° to 30° rake angle with respect to the said cutting edges 2, 2 as shown in FIG. 2.

Figure 3:
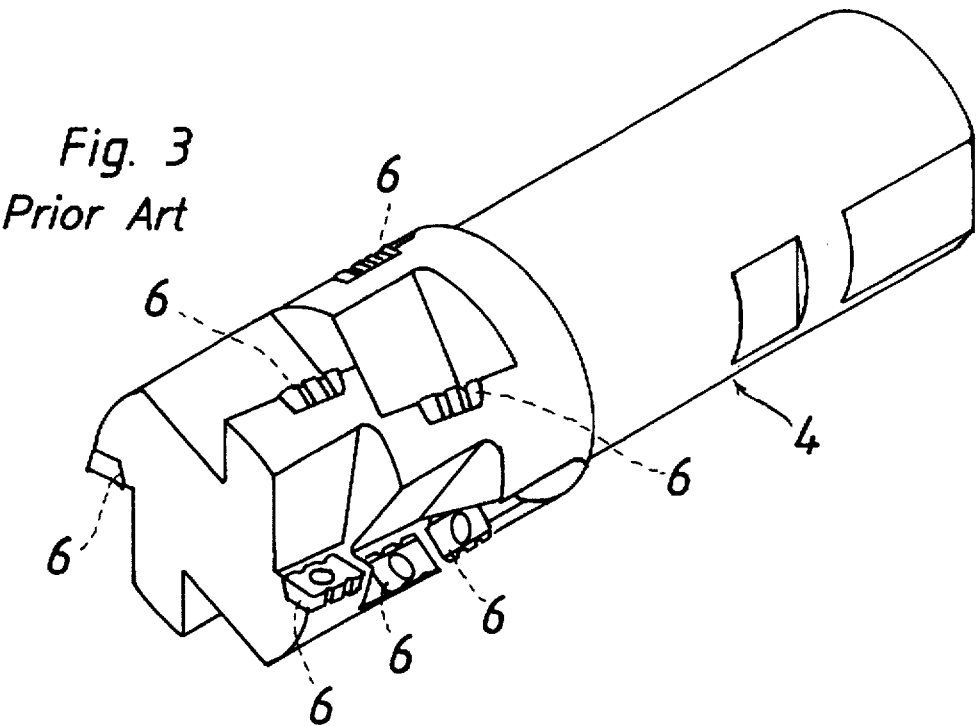
FIG. 3 is a perspective view of a milling cutter with a long cutting edge to which a plurality of throw-away tips are mounted.

FIG. 3 shows the milling cutter 4 to which this tip 1 is mounted, and to this milling cutter 4, a tip seat 6 which faces toward the side face of the cutter proper 5 is provided, and to this tip seat 6, the tip 1 is mounted. This milling cutter 4 is constructed so that each tip 1 is arranged so as to prevent transferring of the profile of the non-cutting flute 3 onto the cut surface of the work resulting from the uncut portion of the said non-cutting flute 3.

Figure 4:
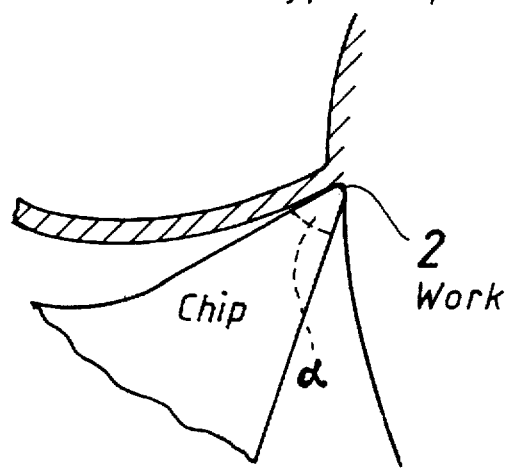
FIG. 4 is a schematic diagram illustrating the chip treatment by throwaway tip for milling cutters of the embodiment of the present invention.

With the milling cutter 4 using the said tip 1 according to this embodiment, the use of the tip 1 with the non-cutting flute Stakes effects of reducing tip resistance and suppressing noise, while the 2° to 30° rake angle formed on the cutting edge of the tip 1 reduces the cutting edge angle α as shown in FIG. 4 and forms chips with small thickness, and because these types of chips flow well and are smoothly discharged, chips scarcely are caught between the cutting edge 2 and the work. Consequently, it is free from the problem of the shipped cutting edge 2 due to welded chips.

In addition, as shown in FIG. 4, because the cutting angle of the cutting edge 2 with respect to the work is small, the cutting resistance further decreases an d even if the cutting edge angle α is small, the problem of short strength does not occur, and because the cutting resistance is extremely small, chattering is also negligibly small and the superbly smooth cut surface results.

EXPERIMENT EXAMPLE 1

To the milling cutter 4 shown in FIG. 3, a total of 10, five pieces each of the said tip which is TiC-coated and is provided with two non-cutting flutes and five pieces each with three non-cutting flutes, respectively, are mounted and the S50G (steel) work is cut under the following conditions:

Cutting speed: 60–140 m/min

Feed: f=0.15 mm/min

Depth of cut: d=50 mm

Dry cutting

Figure 5:
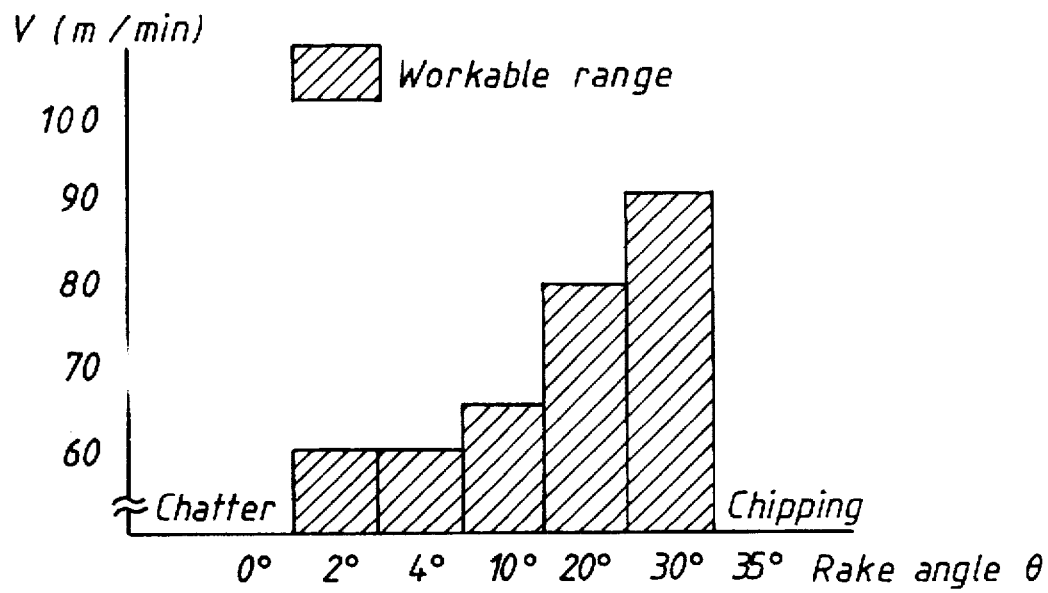
FIG. 5 is a graph showing the results of the experiment example 1.
Figure 6:
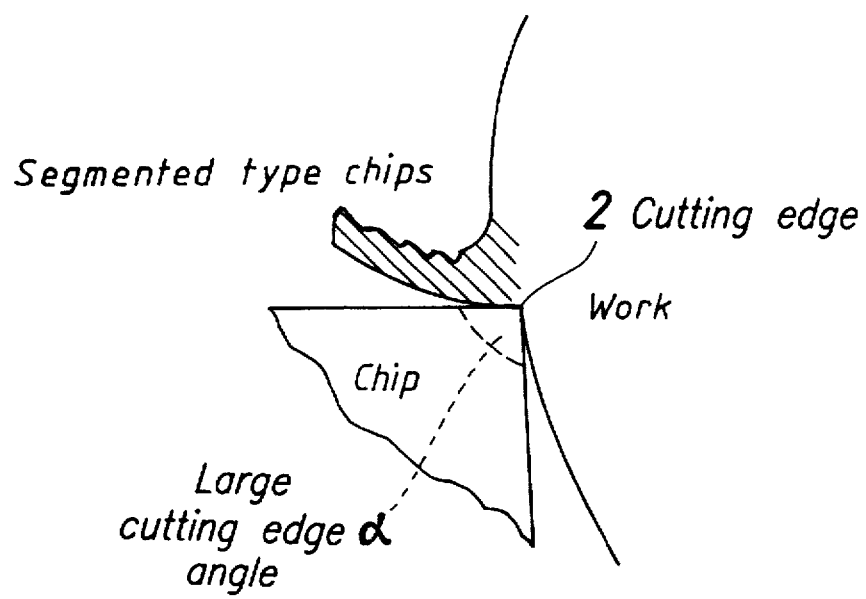
FIG. 6 is a schematic diagram illustrating the chip treatment by conventional throw-away tip for milling cutters.

And the rake angle of the cutting edge 2 is varied and the limit of cutting speed that can cut without any influence of chattering was measured. FIG. 5 shows the results. In the case of the cutting edge 2 without the rake angle, it was confirmed in advance th at the cutting speed that could cut free of influence of chattering was 50 m/min at maximum.

As shown in FIG. 5, when the said rake angle was set to 2° to 30°, the said cutting speed limits were all greater than 60 m/min, and consequently, it was assured that the cutting efficiency was remarkably improved. On the other hand, as a comparison example, in the case of 35° rake angle, the cutting edge 2 broke quickly. Consequently, it was determined that strength became short.

For the said rake angle, it can be said that 10 to 30° rake angles are more desirable, and optimally, the 20° to 30° rake angle remarkably improves the cutting efficiency.

Because the tip of the present invention forms the 2° to 30° rake angle on the tip cutting edge as described above, remarkably excellent effects are achieved as follows:

①The cutting-edge angle of the cutting edge is small and chips with small thickness are formed. Because this kind of chips flow well and are smoothly discharged, chips are not caught between the cutting edge and the work. Consequently, the tip is free from the problem of chipping of cutting edge resulting-from welding of chips.

② Because the cutting-edge angle of the cutting edge with respect to the work is small, the cutting resistance is small and the problem of short strength is not generated even when the cutting-edge angle is small.

③ Because the cutting resistance is extremely small, chattering is also negligibly small and the cut surface is extremely smooth.

What is claimed is:

1. A disposable tip for a milling cutter, the disposable tip comprising:

a substantially planar top surface defining a longitudinal direction, a substantially planar side surface, a substantially planar cutting surface having a cutting edge formed at an intersection of the cutting surface and the side surface, the cutting edge being oriented substantially parallel to the longitudinal direction, and a plurality of flutes formed on the cutting edge, the cutting surface extending above the top surface, the cutting surface and the top surface defining a rake angle between 2° and 30°.

* * * * *